(12) United States Patent
Hughes et al.

(10) Patent No.: US 7,700,703 B2
(45) Date of Patent: Apr. 20, 2010

(54) POLYMER ADDITIVES AND ADHESIVE COMPOSITIONS INCLUDING THEM

(75) Inventors: Katherine Anne Hughes, Blue Bell, PA (US); Alfred Karl Schultz, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 108 days.

(21) Appl. No.: 11/291,681

(22) Filed: Dec. 1, 2005

(65) Prior Publication Data

US 2006/0142493 A1 Jun. 29, 2006

Related U.S. Application Data

(60) Provisional application No. 60/639,030, filed on Dec. 23, 2004.

(51) Int. Cl.
*C08F 20/06* (2006.01)
*C08F 20/10* (2006.01)
*C08F 20/44* (2006.01)
*C08F 20/64* (2006.01)
*C08F 120/04* (2006.01)
*C08L 31/00* (2006.01)
*C08L 33/00* (2006.01)
*C09D 5/02* (2006.01)

(52) U.S. Cl. .............. 526/317.1; 526/318.3; 526/318.4; 524/556

(58) Field of Classification Search ................. 524/556; 526/317.1, 318.3, 318.4
See application file for complete search history.

(56) References Cited

U.S. PATENT DOCUMENTS

| | | | |
|---|---|---|---|
| 4,246,387 A | 1/1981 | Deutsch et al. | |
| 4,683,100 A | 7/1987 | Beckley et al. | |
| 4,912,169 A | 3/1990 | Whitmire et al. | |
| 5,185,396 A | 2/1993 | Biale et al. | |
| 5,362,832 A | 11/1994 | Cook et al. | |
| 6,239,240 B1 | 5/2001 | Schultz et al. | |
| 6,605,318 B2 * | 8/2003 | Even et al. | 427/208.4 |
| 6,713,548 B1 * | 3/2004 | Zhang et al. | 524/458 |
| 6,797,328 B2 * | 9/2004 | Brown et al. | 427/391 |
| 7,078,457 B2 * | 7/2006 | Amick et al. | 524/556 |
| 2006/0100357 A1 * | 5/2006 | Bunn et al. | 524/556 |

FOREIGN PATENT DOCUMENTS

| | | |
|---|---|---|
| JP | 2003-020409 | 1/2003 |
| WO | WO 00/06611 A | 2/2000 |

OTHER PUBLICATIONS

Unzue, M. J. et al., "Reactive Surfactants in Heterophase Polymerization. VI. Synthesis and Screening of Polymerizable Surfactants (Surfmers) with Varying Reactivity in High Solids Styrene-Butyl Acrylate-Acrylic Acid Emulsion Polymerization," *Journal of Applied Polymer Science*, 1977, pp. 1803-1820, vol. 66, John Wiley and Sons, Inc., New York, US.

"Emulsion Polymerizatioin & Emulsion Polymers"—Eds. Peter A. Lovell & Mohamed S. El-Asser (Wiley 1997) p. 443 (last paragraph).

"Handbook of Engineering Polymeric Materials"—Nicholas P. Cheremisinoff (CRC Press 1997) p. 190 (first paragraph).

"Hydrophobic Coatings from Emulsion Polymers"—The Journal of Coatings Technology, David R. Bassett (2001) p. 44 (first paragraph).

Kirk -Othmer Encyclopedia of Chemical Technology, "Coatings", Zeno W. Wicks, Jr. (2002 John Wiley & Sons, Inc.) Article Online Posting Date: Apr. 19, 2002.

* cited by examiner

*Primary Examiner*—Nathan M Nutter
(74) *Attorney, Agent, or Firm*—Stephen T. Falk

(57) ABSTRACT

New polymeric additive including one or more ethylenically unsaturated surfactant monomers are described having a number average molecular weight less than 40,000 and having an improved balance of tack, adhesion, plasticity and peel strength and water whitening resistance as compared to other polymer additives.

13 Claims, No Drawings

POLYMER ADDITIVES AND ADHESIVE COMPOSITIONS INCLUDING THEM

CROSS REFERENCE TO RELATED PATENT APPLICATIONS

This is a non-provisional patent application of U.S. provisional patent application Ser. No. 60/639,030 filed Dec. 23, 2004.

This invention relates to polymeric additives useful for modifying water-based or aqueous adhesives, including pressure sensitive adhesives (PSAs). In particular, this invention is directed to low molecular weight polymer additives comprising one or more polymerizable surfactant monomers. In addition, the invention is further directed to the use of one or more of the polymer additives for modifying adhesive polymers including, but not limited to for example, aqueous acrylic based emulsion polymers.

Acrylic based polymers have utility in adhesives. In many applications, these polymers require compounding with an additive such as for example tackifier resins. Tackifiers provide a convenient and useful tool for modifying pressure-sensitive adhesives as discussed by T. G. Wood, "The Effects of Tackification on Waterborne Acrylic Pressure-Sensitive Adhesive", Adhesive Age, Vol. 30, pp. 19-23 (1987). A good discussion on pressure-sensitive adhesives can be found in Handbook of Pressure-sensitive Adhesive Technology, edited by Don Satas, Van Nostrand Reinhold Co., pp 353-369, (1982).

Tackifier resins are added to acrylic polymers used in adhesive compositions and elastomers to improve the tack (ability to adhere to a substrate surface). This is achieved by better wetting out onto a surface of a substrate and improved specific adhesion thereto. A tackifier resin is used, therefore, to modify the rheological properties of the prepared adhesive composition or formulation, pressure sensitive or non-pressure sensitive. More specifically, the resin ultimately determines the viscoelastic behavior of the final adhesive. As an example, a suitable styrenic block copolymer (that does not have tack and cannot wet out), but mixed with a suitable concentration of compatible resin so that the resulting adhesive prepared from it exhibits tack.

U.S. Pat. No. 4,912,169 discloses that pressure-sensitive adhesives can be improved by incorporating therein a polymeric additive prepared from ethylenically unsaturated monomers having a number average molecular weight (Mn) less than 35,000. The polymeric additive when blended with adhesive polymers prepared from ethylenically unsaturated monomers result in an adhesive composition having an improved balance of adhesive properties including peel strength, shear resistance, and tack. In addition, adhesives prepared incorporating the polymer additives exhibited improved film clarity and ultraviolet (UV) stability as compared to conventional tackifiers.

Conventional tackifiers, including the polymeric tackifiers described above, however tend to migrate within the adhesive, "pooling" on the air/adhesive interface, gathering at the adhesive/substrate interface and "bleeding" from the adhesive and adhered article such that the effective tack of the adhesive is adversely reduced. In addition, conventional tackifiers are prepared with components, including but not limited to conventional surfactants and other actives, that also migrate within the compounded adhesive. Alternative polymer additives, however, would be desirable in providing new or improved compositions and methods for modifying, including but not limited to, tackifying and stabilizing aqueous adhesives as compared to conventional additives, including the polymeric additives described above.

Plasticizers are added to adhesives and elastomers to provide or enhance their corresponding plasticity (elastic recovery from deformation). Specifically, plasticizers are materials which when added to a polymeric material cause an increase in workability and flexibility brought about by a decrease in the glass transition temperature (Tg) of the polymer. Plasticizers are usually of two types, internal and external. Internal plasticizers are made in-situ at the same time the polymer is formed. External plasticizers are fully prepared before they are added to the polymer. Generally, see *Kirk—Othmer Encyclopedia of Chemical Technology*, Vol. 19. pages 258-273 for a discussion of plasticizers.

Conventional plasticizers, however, tend to migrate within the elastomer, "bloom" to the surface and "bleed" from the elastomer so that the effective lifetime of a part fabricated from the elastomer is shortened. This migration is exacerbated by the environments in which some of the elastomeric materials are required to operate. Such environments may caused the plasticizer to be extracted from the elastomer. Subsequently, the plasticization decreases and the environment may be polluted with the plasticizer. In addition, conventional plasticizers are prepared with components, including but not limited to conventional surfactants and other actives, that also migrate within the compounded adhesive or elastomer. One conventional approach in overcoming plasticizer migration problems is by the use of plasticizers having a high molecular weight. However, use of such high molecular weight plasticizers results in elastomer compounding problems. That is, it was very difficult to compound and blend the components into a compatible elastomeric composition. Also, the processability of these elastomers suffer.

U.S. Pat. No. 6,300,407 B1 discloses a plasticizer comprising at least one polymeric material, having a weighted average molecular weight (Mw) of 500 to 1,000,000, formed from at least one ethylenically unsaturated monomer, and (C) a curing agent, wherein the at least one polymeric material is substantially permanent within the elastomer. The polymeric compositions of the elastomer compositions of the present invention are present as interpenetrating networks of polymeric plasticizer and/or processing aids within the elastomer polymer matrix. The polymeric (meth)acrylate chains are trapped within the elastomer thereby having an enhanced permanence within the elastomer. Alternative polymer additives, however, would be desirable in providing new or improved compositions and methods for modifying, including but not limited to, plasticizing and stabilizing aqueous adhesives as compared to conventional additives, including the polymeric additives described above.

Applicants have discovered polymer additives comprising one or more emulsion polymers that are prepared using one or more surfactant monomers results in polymer additives exhibiting higher surface tension, wetting, tack and compatibility to plasticizers as compared to other known polymeric additives. The polymer additives are combined with one or more adhesive polymers or elastomers to prepare adhesive and elastomers having enhanced surface tension, wetting, tack and compatibility to plasticizers without attendant migration or compatibility problems associated with prior art adhesive and elastomer compositions. Applicants have further discovered other polymer additives that are combined with one or more adhesive polymers or elastomers to prepare adhesive and elastomers having enhanced plasticity without attendant migration or compatibility problems associated with prior art adhesive and elastomer compositions. This is true even in elastomeric materials, such as fluoroelastomers, which have heretofore had no or at best very few plasticizers available for use therein. In addition, the polymer additives of the invention are multifunctional polymer modifying agents that can act to, for example, stabilize, tackify, and plasticize blends of adhesive polymers and elastomer blends by inhibiting migration of conventional active and reactive components including, but not limited to for example, surfactants, emulsifiers, tackifiers and plasticizers present in adhesive polymers. Moreover, adhesive and elastomer compositions prepared and including one or more polymer additives of the invention exhibit an improved balance of properties including, but not limited to for example, peel strength, shear strength, water resistance, water whitening resistance, tack and plasticity as compared to corresponding conventional additives used to prepare them.

Accordingly, the present invention provides an additive comprising an aqueous acrylic emulsion polymer further comprising, as copolymerized units, 0.25% to 99.75% by weight, based on dry polymer weight, of one or more monoethylenically unsaturated nonionic C1-C10 (meth)acrylic monomers, from 0.40% to 99.75% by weight, based on dry polymer weight of one or more ethylenically unsaturated surfactant monomers and from 0.25% to 10% by weight, based on dry polymer weight, of one or more monoethylenically unsaturated acid monomers; the polymer additive having a Tg of $-100°$ C. to $100°$ C. and a weight average molecular weight between 1,000 and 40,000.

The present invention also provides an adhesive composition or an elastomer comprising: (a) from 0.5 to about 55% on a dry weight basis of one or more polymeric additives prepared from an aqueous acrylic emulsion polymer further comprising, as copolymerized units, 0.25% to 99.75% by weight, based on dry polymer weight, of one or more monoethylenically unsaturated nonionic C1-C10 (meth)acrylic monomers, from 0.40% to 99.75% by weight, based on dry polymer weight of one or more ethylenically unsaturated surfactant monomers and from 0.25% to 10% by weight, based on dry polymer weight, of one or more monoethylenically unsaturated acid monomers; the aqueous emulsion polymer having a Tg of $-100°$ C. to $100°$ C. and a weight average molecular weight between 1,000 and 40,000; and one or more adhesive polymers or copolymers prepared from one or more monomers selected from the group consisting of styrene, butadiene, acrylonitrile, ethylene, vinyl acetate, acrylic acid, esters of acrylic acid, methacrylic acid and esters of methacrylic acid.

The present invention also provides an additive comprising: an aqueous acrylic emulsion polymer further comprising, as copolymerized units, 0.25% to 99.75% by weight, based on dry polymer weight, of one or more monoethylenically unsaturated nonionic C10-C50 (meth)acrylic monomers, from 0.40% to 99.75% by weight, based on dry polymer weight of one or more ethylenically unsaturated surfactant monomers and from 0.25% to 10% by weight, based on dry polymer weight, of one or more monoethylenically unsaturated acid monomers; the polymer additive having a Tg of $-100°$ C. to $100°$ C. and a weight average molecular weight between 500 and 50,000.

The present invention also provides an adhesive composition or an elastomer comprising: (a) from 0.5 to about 55% on a dry weight basis of one or more polymeric additives prepared from an aqueous acrylic emulsion polymer further comprising, as copolymerized units, 0.25% to 99.75% by weight, based on dry polymer weight, of one or more monoethylenically unsaturated nonionic C10-C50 (meth)acrylic monomers, from 0.40% to 99.75% by weight, based on dry polymer weight of one or more ethylenically unsaturated surfactant monomers and from 0.25% to 10% by weight, based on dry polymer weight, of one or more monoethylenically unsaturated acid monomers; the aqueous emulsion polymer having a Tg of $-100°$ C. to $100°$ C. and a weight average molecular weight between 500 and 50,000; and one or more adhesive polymers or copolymers prepared from one or more monomers selected from the group consisting of styrene, butadiene, acrylonitrile, ethylene, vinyl acetate, acrylic acid, esters of acrylic acid, methacrylic acid and esters of methacrylic acid.

The present invention also provides a multifunctional additive comprising: an aqueous acrylic emulsion polymer further comprising, as copolymerized units, 0.25% to 99.75% by weight, based on dry polymer weight, of one or more monoethylenically unsaturated nonionic (meth)acrylic monomers, from 0.40% to 99.75% by weight, based on dry polymer weight of one or more ethylenically unsaturated surfactant monomers and from 0.25% to 10% by weight, based on dry polymer weight, of one or more monoethylenically unsaturated acid monomers; the polymer additive having a Tg of $-100°$ C. to $100°$ C. and a weight average molecular weight between 500 and 50,000.

The present invention also provides an adhesive composition or elastomer containing a blend of (a) one or more adhesive polymers or copolymers prepared from one or more monomers selected from the group consisting of styrene, butadiene, acrylonitrile, ethylene, vinyl acetate, acrylic acid, esters of acrylic acid, methacrylic acid and esters of methacrylic acid and (b) from 0.5 to about 55% on a dry weight basis of one or more multifunctional polymeric additives wherein said multifunctional polymeric additive polymeric additive comprises one or more aqueous acrylic emulsion polymers further comprising, as copolymerized units, 0.25% to 99.75% by weight, based on dry polymer weight, of monoethylenically unsaturated nonionic (meth)acrylic monomer, from 0.40% to 99.75% by weight, based on dry polymer weight of one or more ethylenically unsaturated surfactant monomers and from 0.25% to 10% by weight, based on dry polymer weight, of monoethylenically unsaturated acid monomer; the polymer additive having a Tg of $-100°$ C. to $100°$ C. and a weight average molecular weight between 500 and 50,000.

As used herein, the term "ethylenically unsaturated surfactant monomers" refers to monomers that when added to water reduces the surface tension of water to less than 72 dynes/cm. The ethylenically unsaturated groups of ethylenically unsaturated monomers used in the present invention are polymerized under conditions of emulsion polymerization described herein and are incorporated in aqueous emulsion polymers formed and then subsequently used to prepare adhesives of the invention.

As used herein the term "plasticizer" refers to a polymer having a lower Tg than the substance it is used to plasticize. The polymer additives of the invention that function as plasticizers are stabilized with one or more ethylenically unsaturated surfactant monomers, are compatible with the aqueous polymers they are combined with in terms of Mw and composition, imparts plasticity to the adhesive and elastomer to which it is added and minimizes the migration of plasticizer and components used to prepare the plasticizer in the adhesive composition and elastomer to which it is added.

As used herein the term "tackifier" refers to a polymer having a higher Tg than the substance it is used to tackify. The polymer additives of the invention that function as tackifiers are stabilized with one or more ethylenically unsaturated surfactant monomers, are compatible with the aqueous polymers they are combined with in terms of Mw and composition, imparts tack to the adhesive and elastomer to which it is added and minimizes the migration of tackifier and components used to prepare the tackifier in the adhesive composition and elastomer to which it is added.

As used herein the term "multifunctional polymer additive" refers to additives that when added to a blend of aqueous polymers, plasticizes higher Tg components of the blend and imparts tack to lower Tg components of the polymer blend. The additives of the invention that function as multifunctional additives are stabilized with one or more ethylenically unsaturated surfactant monomers, are compatible with the aqueous polymers they are combined with in terms of Mw and composition, imparts plasticity, stability and tack to the corresponding components of the polymer blend to which it is added and which makes up the adhesive and elastomer and minimizes the migration of the additive in the adhesive composition and elastomer to which it is added.

The aqueous adhesive compositions of the present invention includes an aqueous dispersion of polymeric particles having a mean diameter in the range of from 10 to 800 nm, the particles including, as polymerized units, at least one multiethylenically or ethylenically unsaturated monomer, at least one ethylenically unsaturated surfactant monomer and at least one ethylenically unsaturated water soluble monomer. As used herein, the term "dispersion" refers to a physical state of matter that includes at least two distinct phases wherein a first phase is distributed in a second phase, the second phase being a continuous medium. By "aqueous" herein is meant a medium that is from 50 to 100 wt. % water, based on the weight of the aqueous medium.

According to one embodiment, the low molecular weight polymeric additive is prepared from an aqueous acrylic emulsion polymer further comprising, as copolymerized units, 0.25% to 99.75% by weight, based on dry polymer weight, of monoethylenically unsaturated nonionic C1-C10 (meth) acrylic monomer, from 0.40% to 99.75% by weight, based on dry polymer weight of one or more ethylenically unsaturated surfactant monomers and from 0.25% to 10% by weight, based on dry polymer weight, of monoethylenically unsaturated acid monomer. The polymeric additive has a weight average molecular weight less than about 50,000, including between 1,000 and 40,000.

The polymeric additive includes at least one aqueous emulsion polymer prepared from one or more ethylenically unsaturated monomers, including but not limited to acrylic emulsion polymers. The aqueous acrylic emulsion polymer contains, as copolymerized units, from 0.40% to 99.75% by weight, based on dry polymer weight, of monoethylenically-unsaturated non-ionic C1-C10 (meth)acrylic monomers including esters, amides, and nitriles of (meth)acrylic acid, such as, for example, (meth)acrylic ester monomer including methyl acrylate, ethyl acrylate, butyl acrylate, 2-ethylhexyl acrylate, iso-octyl acrylate, decyl acrylate, methyl methacrylate, butyl methacrylate, hydroxyethyl methacrylate, hydroxypropyl methacrylate; urieido (meth)acrylate; (meth)acrylonitrile and(meth)acrylamide. The use of the term "(meth)" followed by another term such as acrylate, acrylonitrile, or acrylamide, as used throughout the disclosure, refers to both acrylate, acrylonitrile, or acrylamide and methacrylate, methacrylonitrile, and methacrylamide, respectively. By "non-ionic monomer" herein is meant that the copolymerized monomer residue does not bear an ionic charge between pH=1-14.

A wide variety of monomers or mixture of monomers larger than C10 may be used to make the emulsion polymer used in the adhesives of this invention. For example, acrylic ester monomers, including isodecyl acrylate, lauryl acrylate, bornyl acrylate, isobornyl acrylate, myristyl acrylate, pentadecyl acrylate, stearyl acrylate and the like; methacrylic acid ester monomers, including methyl methacrylate, ethyl methacrylate, propyl methacrylate, isopropyl methacrylate, butyl methacrylate, isobutyl methacrylate, hexyl methacrylate, octyl methacrylate, isooctyl methacrylate, decyl methacrylate, isodecyl methacrylate, lauryl methacrylate, bornyl methacrylate, isobornyl methacrylate, myristyl methacrylate, pentadecyl methacrylate, stearyl methacrylate, phosphoethyl methacrylate and the like; acrylic acid (AA), methacrylic acid (MAA), itaconic acid, maleic acid, fumaric acid, styrene, substituted styrenes, butadiene, acrylonitrile, ethylene, vinyl acetate, vinyl chloride, sodium styrene sulfonates, sodium vinyl sulfonate, acrylamide, methacrylamide and the like may be used. Other emulsion polymers may include, but are not limited to, dispersions of polyurethanes, polyesters, natural rubber, synthetic rubbers, polyvinyl ether, polyvinyl chloride and copolymers thereof.

According to a separate embodiment, the polymeric additive is prepared from an aqueous acrylic emulsion polymer further comprising, as copolymerized units, 0.25% to 99.75% by weight, based on dry polymer weight, of monoethylenically unsaturated nonionic C10-C50 (meth)acrylic monomer, from 0.40% to 99.75% by weight, based on dry polymer weight of one or more ethylenically unsaturated surfactant monomers and from 0.25% to 10% by weight, based on dry polymer weight, of monoethylenically unsaturated acid monomer. The polymeric additive has a weight average molecular weight less than about 1,000,000, including less than 100,000 including between 500 and 50,000.

Suitable examples of monoethylenically unsaturated nonionic C10-C50 (meth)acrylic monomers includes, but is not limited to for example, C10 -C50 alkyl(meth)acrylates. Other suitable example include but are not limited to for example C1-C50 alkyl(meth)acrylates substituted with a halogen, a nitro group, a cyano group, a haloalky group, a carboxy group, an amino group, an alkylamino group or a dialkylamino group.

The aqueous emulsion polymer also includes, as copolymerized units, from 0.25% to 99.75% by weight, based on polymer weight, of one or more ethylenically unsaturated surfactant monomers. The ethylenically unsaturated surfactant monomers are surface active agents and are especially useful in emulsion polymerization reactions and are generally capable of co-polymerizing with other ethylenically unsaturated monomers which are conventionally employed in emulsion polymerization reactions, and are capable of polymerizing with themselves, or co-polymerization with a partially polymerized polymer.

Suitable ethylenically unsaturated surfactant monomers include, but are not limited to for example, salts or quaternary nitrogen compounds comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least on ethylenically unsaturated moiety. Other suitable examples are described in U.S. Pat. Publ. No. 2003/0149119.

Other suitable polymerizable surfactant monomers include nonylphenoxy propenyl polyethoxylated sulphate (for example as Hitenol™ from Daiichi Corp); sodium alkyl allyl sulphosuccinate (for example as Trem™ LF-40 from Henkel Corp); ammonium di-(tricyclo(5.2.1.0 2, 6) dec-3-en-(8 or 9)oxyethyl sulfosuccinate; and ammonium di-(tricyclo(5.2.1.0 2,6) dec-3-en-(8 or 9) sulfosuccinate. Additionally, the ammonium and metal salts of unsaturated $C_6$ to $C_{30}$ organic acids can be used, alone or in combination with the above surfactants. Examples of these acids are: alpha methyl cinnamic acid, alpha phenyl cinnamic acid, oleic acid, lineolic acid (as described in U.S. Pat. No. 5,362,832), rincinoleic acid, the unsaturated fraction of Tall oil rosin and fatty acids, disproportionated rosin acid, soybean oil fatty acids, olive oil fatty acids, sunflower oil fatty acids, linseed oil fatty acids, safflower oil fatty acids, sorbitan mono-oleate, abietic acid, poly(oxyethylene) sorbitol sesquioleate, and Empol™ 1010 Dimer Acid. Additional suitable polymerizable surfactant monomers also include, for example, maleate derivatives (as described in U.S. Pat. No. 4,246,387), and allyl derivatives of alkyl phenol ethoxylates (as described in Japanese Pat. No. 62 227435). The amount of surfactant used is typically from 0.1% to 6% by weight, based on the total weight of monomer.

According to a separate embodiment, an additive is prepared from one or more polymerizable surfactant monomers in an amount from 0.40% to 100% by weight. One example is a homopolymer or copolymer prepared from one or more polymerizable surfactant monomers.

The aqueous emulsion polymer also contains, as copolymerized units, from 0.25% to 10% by weight, based on dry polymer weight, monoethylenically-unsaturated acid monomer such as, for example, acrylic acid, methacrylic acid, crotonic acid, itaconic acid, sulfoethyl methacrylate, phosphoethyl methacrylate (PEM), fumaric acid, maleic acid, monomethyl itaconate, monomethyl fumarate, monobutyl fumarate, and maleic anhydride. Preferably, the emulsion polymer contains, as copolymerized units, from 0.3% to 2.5% by weight, based on dry polymer weight, (meth) acrylic acid.

The aqueous emulsion polymer further contains, as copolymerized units, from 0 to 49.75% by weight, based on dry polymer weight, of optional monomers which are neither monoethylenically unsaturated non-ionic (meth)acrylic monomers nor monoethylenically unsaturated acid monomers. Optional monomers include, for example, styrene or alkyl-substituted styrenes; butadiene; aminoalkyl(meth)acrylate N-alkyl aminoalkyl(meth)acrylate, N,N-dialkyl aminoalkyl(meth)acrylate; vinyl acetate, vinyl propionate, or other vinyl esters; vinyl monomers such as vinyl chloride, vinylidene chloride, and N-vinyl pyrollidone; allyl methacrylate, vinyl toluene, vinyl benzophenone, diallyl phthalate, 1,3-butylene glycol dimethacrylate, 1,6-hexanedioldiacrylate, and divinyl benzene.

The emulsion polymers used in this invention are substantially uncross-linked, when it is applied to a substrate in the method of this invention, although low levels of deliberate or adventitious cross-linking can be present. When low levels of pre-cross-linking or gel content are desired low levels of optional non-ionic multiethylenically unsaturated monomers such as, for example, 0.001% -5%, by weight based on the dry polymer weight, can be used. It is important, however, that the quality of the film formation is not materially impaired.

The polymeric additive of this invention is prepared by any of the known polymerization processes such as emulsion, suspension, solution, inverse or bulk polymerization.

According to one embodiment, the polymeric additive is prepared by emulsion polymerization using 1-20 mole percent of a chain transfer agent to achieve low molecular weight. Using emulsion polymerization to prepare polymeric additives of this invention provides advantages of better cost efficiency and mixability with water-based adhesive compositions. Suitable chain transfer agents for this polymerization include, for example, C1-C15 alkyl mercaptans, benzyl mercaptan, 3-mercaptoprionic acid and esters thereof, mercaptoethanol, benzyl alcohol, alpha-methyl benzyl alcohol, and ethyl mercaptoacetate and the like.

Typically, the initiator and the monomers to be polymerized in the emulsion polymerization are added to an aqueous medium at controlled rates and the polymerization is carried out in the presence of a stabilizer. However, the use of polymerizable surfactant monomers may render the addition of stabilizers unnecessary.

In one embodiment of the present invention the aqueous acrylic emulsion polymer is prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer can contain the same monomers, surfactants, redox initiation system, chain transfer agents, etc. as disclosed herein-above for the emulsion polymer. In the case of a multi-staged polymer particle at least one of the stages shall meet the description of the aqueous emulsion polymer. The polymerization techniques used to prepare such multistage emulsion polymers are well known in the art such as, for example, U.S. Pat. Nos. 4,325,856; 4,654,397; and 4,814,373.

The glass transition temperature ("Tg") of the aqueous acrylic emulsion polymer depends on the type of adhesive or elastomer desired and is typically from $-100°$ C. to $100°$ C. The monomers and amounts of the monomers selected to achieve both the desired polymer Tg range for preparing a specific type of adhesive are well known in the art. Tgs used herein are those calculated by using the Fox equation (T. G. Fox, Bull. Am. Physics Soc., Volume 1, Issue No. 3, page 123(1956). The glass transition temperatures of homopolymers are found, for example, in "Polymer Handbook", edited by J. Brandrup and E. H. Immergut, Interscience Publishers.

The ability of a polymeric additive to improve the performance of adhesive compositions depends on its molecular weight, Tg and the degree of compatibility between the additive and the adhesive polymer. Compatibility is a measure of the mutual solubility of two materials and compatible blends are characterized by (1) the existence of a single homogeneous phase which contains no discrete domains of either component and (2) a single glass transition temperature for the blend of components as discussed by P. B. Rim and E. B. Orler, "Dependence of Tg on Composition for a Compatible Polymer/Oligomer Blend", Macromolecules, Vol. 20, pp. 433-435 (1987). A lack of compatibility is generally evidenced by haziness in the dried film and a decrease in tack. Compatibility is typically favored between materials which are similar in composition and low in molecular weight. In order to effectively modify the performance of an adhesive, the polymeric additives of this invention should show an appreciable degree of compatibility with the adhesive polymer, although the two components need not be completely compatible.

It is desirable to optimize the balance of properties of an adhesive such as peel strength, shear strength, tack, plasticity and film clarity. All of these properties are important to adhesive compositions and the best advantages are achieved where the overall balance of these properties have been optimized.

To achieve the necessary balance of adhesive properties, the polymeric additive of this invention requires a weight average molecular weight less than about 50,000.

The polymeric additive of this invention can be added to the adhesive compositions by any known technique, such as by mixing or blending, to uniformly incorporate the additive into the adhesive compositions. The additive is preferably added to the adhesive composition in the form of an aqueous emulsion or an emulsified solution in a combined aqueous/organic solvent medium. An effective amount of the polymeric additive typically ranges from about 1% to about 55% by weight based on the total dry weight of the adhesive composition.

The polymeric additive of this invention can be used in a variety of adhesive and elastomer compositions, including pressure sensitive adhesives. These adhesive compositions may contain rubbers such as isoprene and acrylonitrile-butadiene-styrene and polymers or copolymers prepared from styrene, butadiene, ethylene, vinyl acetate, acrylic acid or esters thereof, and methacrylic acid or esters thereof.

Any suitable adhesive or elastomer composition is usefully modified using one or more of the polymer additives of the present invention. The adhesive and elastomer compositions can contain conventional adhesive adjuvants in addition to the polymeric additives of the invention such as, for example, tackifiers other than those described herein, emulsifiers and wetting agents, cross-linkers, monomers, oligomers, polymers, solvents or plasticizers, buffers, neutralizers, thickeners or rheology modifiers, biocides, antifoaming or defoaming agents.

The solids content of the aqueous adhesive and elastomer compositions of the present invention can be from about 10% to about 70% by weight. The viscosity is typically from 0.05 to 5 Pa.s (50 cps to 5000 cps), as measured using a Brookfield viscometer; the viscosities appropriate for different end uses and application methods vary considerably. The adhesive is applied by conventional adhesive application methods such as, for example, curtain coating, roller coating, reverse roller coating, meyer rod, slot die and gravure coating.

Accordingly, in the adhesive and elastomer compositions of the present invention the one or more polymeric additives are substantially permanent within the adhesive and elastomer. For the purposes of this specification, including the attached claims, the term substantially permanent means that there will be a minimal amount of migration and or movement of the one or more polymeric additives useful as plasticizers, stabilizers, modifiers and tackifiers from the adhesive and elastomeric compositions because of compatibility problems (see below) or in response to an external stimulus such as heat and/or solvent extraction. Generally, the loss of polymer additive from the elastomer will be less than 0.5 percent, including less than 0.1 percent by weight of the total weight of the one or more polymeric additives.

By compatibility of the one or more polymeric additives and the adhesive or elastomer is meant that the one or more polymeric additive remains within the adhesive or elastomer, i.e., maintains it's position within the adhesive or elastomer during mixing (also is able to be mixed into the adhesive or elastomer), molding and during use of any piece prepared from the adhesive or elastomer composition. The polymer additives of the present invention do not migrate ("bloom", "pool" or "bleed") to the interfaces or surface of the adhesive or elastomer composition. In addition, the polymer additives have minimal change of position within the adhesive or elastomer composition.

As used herein, the term "elastomer" refers to any polymer which undergoes reversible extensibility and includes both elastomers and thermoplastic elastomers. Also, the term "polymeric" is understood to include within its scope all types of molecules characterized as having repeating units of atoms or molecules linked to each other such as oligomers, homopolymers, co-polymers including block, random and alternating co-polymers, grafted polymers and co-polymers, terpolymers, etc.

The elastomer compositions of the present invention include at least one elastomer. The elastomer is generally present in the elastomer composition from 20 to 99.9, including from 40 to 99.9 and from 60 to 99.9 percent by weight of the elastomer composition.

Any suitable elastomer may be used in the elastomer compositions of the present invention. One useful type of elastomer is a thermosetting, cross-linking elastomer. Other suitable elastomers include, but are not limited to, natural rubbers; modified natural rubbers including those grafted with acrylates or those which are halogenated; styrene-butadiene elastomers such as styrene-butadiene rubber (SBR), solution SBR (SSBR), carboxylated SBR (XSBR), high styrene-butadiene copolymer (HS/B), pyridine(vinyl)-styrene-butadiene rubber (PSBR); chloroprene elastomers such as poly-chloroprene elastomers (CR) and carboxylated poly-chloroprene rubber (XCR); polybutadiene elastomers including 1-2 isomers, hydroxyl, carboxyl, emulsion polybutadiene rubber(EBR), and halogen terminated polybutadiene elastomers; butyl elastomers such as polyisoprene elastomers (IR), isoprene/isobutylene elastomers (IIR), halogenated butyl rubber (HIIR) such as bromobutyl elastomer, chlorobutyl elastomer, and poyisobutylene elastomers; nitrile elastomers such as acrylonitrile-butadiene elastomers (NBR), carboxylated NBR (XNBR), hydrogenated and partially hydrogenated acrylonitrile-butadiene elastomer (HNBR), nitrile-isoprene elastomers (NIR); polyethylene elastomers such as chlorinated polyethylene elastomer and chlorosulfonated-ethylene elastomer; ethylene-propylene elastomers such as co-polymers (EPM) and terpolymers (EPDM) of ethylene and propylene; acrylic based elastomers such as acrylate elastomers (AM), acrylate butadiene elastomer (ABR), and ethylene-acrylic elastomers; silicone elastomers such as organopolysiloxane elastomers; fluoroelastomers; epichlorohydrin elastomer; polyalkenamer elastomers such as elastomers prepared, for instance, from cyclooctene, cyclopentene, or 1,5-cyclooctadiene monomers; organic polysulfide elastomers; urethane elastomers; and mixtures or blends thereof. In one embodiment, the at least one elastomer is a styrene-butadiene elastomer, chloroprene elastomer, butyl elastomer, polybutadiene elastomer, nitrile elastomer, polyethylene elastomer, ethylene-propylene elastomer, acrylic elastomer, silicone elastomer, fluoroelastomer, epichlorohydrin elastomer, polyalkenamer elastomer, polysulfide elastomer, urethane elastomer, mixtures thereof or blends thereof. In a preferred embodiment, the at least one elastomer is an acrylonitrile-butadiene elastomer, hydrogenated acrylonitrile-butadiene elastomer, partially hydrogenated acrylonitrile-butadiene elastomer, modified polyethylene elastomers such as chlorinated or chlorosulfonated polyethylene elastomer, ethylene-acrylic elastomer, styrene-butadiene elastomer, fluoroelastomer, or mixtures or blends thereof. In a more preferred embodiment, the at least one elastomer is acrylonitrile-butadiene elastomer, hydrogenated acrylonitrile-butadiene elastomer, partially hydrogenated acrylonitrile-butadiene elastomer, fluoroelastomer, mixtures thereof or blends thereof. In a most preferred embodiment, the at least one elastomer is a fluoroelastomer.

The elastomer may also be a thermoplastic-elastomer (TPE) having an elastomeric component and a thermoplastic component. Suitable examples include, but are not limited to polyolefin thermoplastic elastomers, polyester/polyether thermoplastic elastomers, thermoplastic elastomers based on isoprene homopolymers and co-polymers, and urethane thermoplastic elastomers.

The elastomer compositions of the present invention also include at least one polymeric material formed from at least one ethylenically unsaturated monomer. The polymeric material is generally present in the elastomer composition from 1 to 100, preferably 1 to 50, more preferably 2 to 30 PHR. The term "PHR" is understood to mean parts per 100 parts elastomer. Generally, the at least one polymeric material present in the elastomer has a weighted average molecular weight (Mw) of 500 to 1,000,000, including from 500 to 500,000, from 500 to 100,000, and from 500 to 50,000.

Ethylenically unsaturated monomers which are useful as monomers in the present invention include acrylic and methacrylic acid and esters thereof. Generally, the (meth)acrylates are C10 to C50 (meth)acrylates.

Another class of suitable ethylenically unsaturated monomers is vinylaromatic monomers which includes, among others, styrene, alpha. methylstyrene, vinyltoluene, p-methylstyrene, ethylvinylbenzene, vinylnaphthalene, vinylxylenes, and the like. The vinylaromatic monomers can also include their corresponding substituted counterparts, such as halogenated derivatives, i.e., containing one or more halogen groups, such as fluorine, chlorine or bromine; and nitro, cyano, alkoxy, haloalkyl, carbalkoxy, carboxy, amino, alkylamino derivatives and the like.

Another class of suitable ethylenically unsaturated monomers is nitrogen-containing ring compounds and their thio-analogs, such as vinylpyridines such as 2-vinylpyridine or 4-vinylpyridine, and lower alkyl (C.sub.1-C.sub.8) substituted C-vinyl pyridines such as: 2-methyl-5-vinyl-pyridine, 2-ethyl-5-vinylpyridine, 3-methyl-5-vinylpyridine, 2,3-dimethyl-5-vinyl-pyridine, 2-methyl-3-ethyl-5-vinylpyridine; methyl-substituted quinolines and isoquinolines, N-vinylcaprolactam, N-vinylbutyrolactam, N-vinylpyrrolidone, vinyl imidazole, N-vinyl carbazole, N-vinyl-succinimide, acrylonitrile, o-, m-, or p-aminostyrene, maleimide, N-vinyl-oxazolidone, N,N-dimethyl aminoethyl-vinyl-ether, ethyl-2-cyano acrylate, vinyl acetonitrile, N-vinylphthalimide. Also included are N-vinyl-thio-pyrrolidone, 3 methyl-1-vinyl-pyrrolidone, 4-methyl-1-vinyl-pyrrolidone, 5-methyl-1-vinyl-pyrrolidone, 3-ethyl-1-vinyl-pyrrolidone, 3-butyl-1-vinyl-pyrrolidone, 3,3-dimethyl-1-vinyl-pyrrolidone, 4,5-dimethyl-1-vinyl-pyrrolidone, 5,5-dimethyl-1-vinyl-pyrrolidone, 3,3,5-trimethyl-1-vinyl-pyrrolidone, 4-ethyl-1-vinyl-pyrrolidone, 5-methyl-5-ethyl-1-vinyl-pyrrolidone, 3,4,5-trimethyl-1-vinyl-pyrrolidone, and other lower alkyl substituted N-vinyl-pyrrolidones.

Another class of suitable ethylenically unsaturated monomers is substituted ethylene monomers, such as vinyl acetate, vinyl chloride, vinyl fluoride, vinyl bromide, vinylidene chloride, vinylidene fluoride, vinylidene bromide, acrylonitrile, methacrylonitrile, acrylic acid and corresponding amides and esters, methacrylic acid and corresponding amides and esters.

Another class of acrylic and methacrylic acid derivatives is represented by substituted alkyl acrylate and methacrylate and substituted acrylamide and methacrylamide monomers. Examples include (meth)acrylates wherein the alkyl group is substituted with halogen, such as fluorine, chlorine or bromine; and nitro, cyano, alkoxy, haloalkyl, carbalkoxy, carboxy, amino, alkylamino derivatives and the like.

Each of the substituted monomers can be a single monomer or a mixture having different numbers of carbon atoms in the alkyl portion. In one embodiment, the monomers are selected from the group consisting of hydroxy-(C2-C6)alkyl-methacrylates, hydroxy(C2-C6)alkyl acrylates, dialkylamino (C2-C6)-alkylmethacrylates, dialkylamino(C2-C6)alkyl acrylates, dialkylamino(C2-C6)alkyl meth-acrylamides and dialkylamino(C2-C6)alkyl acrylamides. The alkyl portion of each monomer can be linear or branched.

Examples of substituted alkyl methacrylate and acrylate monomers with one or more hydroxyl groups in the alkyl radical, especially those where the hydroxyl group is found at the beta-position (2-position) in the alkyl radical. Hydroxyalkyl methacrylate and acrylate monomers in which the substituted alkyl group is a (C2-C6)alkyl, branched or unbranched, are preferred. Among the hydroxyalkyl methacrylate and acrylate monomers suitable for use in the present invention are 2-hydroxyethyl methacrylate (HEMA), 2-hydroxyethyl acrylate(HEA), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate and 2-hydroxybutyl acrylate. The preferred hydroxyalkyl methacrylate and acrylate monomers are HEMA, 1-methyl-2-hydroxyethyl methacrylate and 2-hydroxypropyl methacrylate. A mixture of the latter two monomers is commonly referred to as "hydroxypropyl methacrylate" or HPMA.

Additional examples of substituted (meth)acrylate monomers are those alkyl methacrylate and acrylate monomers with a dialkylamino group in the alkyl radical, such as dimethylaminoethyl methacrylate, dimethylaminoethyl acrylate and the like.

Other examples of substituted (meth)acrylate monomer are nitrogen-containing ring compounds (previously described) and dialkylaminoalkyl methacrylamide and acrylamide monomers, such as N,N-dimethylaminoethyl methacrylamide, N,N-dimethyl-aminopropyl methacrylamide, N,N-dimethylaminobutyl methacrylamide, N,N-di-ethylaminoethyl methacrylamide, N,N-diethylaminopropyl methacrylamide, N,N-diethylaminobutyl methacrylamide, N-(1,1-dimethyl-3-oxobutyl)acrylamide, N-(1,3-diphenyl-1-ethyl-3-oxobutyl)acrylamide, N-(1-methyl-1-phenyl-3-oxobutyl) methacrylamide, and 2-hydroxyethyl acrylamide, N-methacrylamide of aminoethyl ethylene urea, N-methacryloxy ethyl morpholine, N-maleimide of dimethylaminopropylamine and the like.

Another group of ethylenically unsaturated monomers are C20 to C50 (meth)acrylates formed from C20 to C50 synthetic alcohols. Generally, the (meth)acrylates are formed by reacting a C20 to C50 synthetic alcohols or ethoxylate thereof with a low-cut alkyl(meth)acrylate in the presence of a zirconium catalyst and suitable inhibitor. Suitable alcohols or ethoxylates are available from Baker Petrolite, Inc. St. Louis, Mo. as Unilin™ or Unithox™ products. In one embodiment, the at least one monomer is a (meth)acrylate monomer product prepare from a C20 to C50 alcohol or ethoxylate. Suitable examples of such monomers and preparation of the same are disclosed and described in U.S. Pat. No. 5,856,611 issued Jan. 5, 1999.

The elastomer compositions of the present invention may also include a cross-linking accelerator to be used in combination with the curing agent. The accelerator provides shortening of cross-linking time, lowering of cross-linking temperature, and improvement in the properties of the cross-linked product. The cross-linking accelerator is generally present from 0.1 to 30, preferably from 0.5 to 20, more preferably from 1 to 10 PHR.

Suitable examples of cross-linking accelerators include, but are not limited to mecaptobenzothiazole, tetramethylthiuram disulfide, zinc dimethyl dithiocarbamate, for use with a sulfur curing agent; and 1,3-butanediol dimethacrylate, ethylene glycol dimethacrylate, 1,4-butanediol dimethacrylate, 1,6-hexanediol dimethacrylate, polyethylene glycol dimethacrylate, 1,4-butanediol diacrylate, 1,6-hexanediol diacrylate, 2,2'-bis(4-methacryloyldiethoxyphenyl)propane, trimethylolpropane trimethacrylate, trimethylolpropane triacrylate, pentaerythritol trimethacrylate, divinylbenzene N,N'-methylene(bis)acrylamide, p-quinone dioxime, p,p'-dibenzoylquinone dioxime, triazinedithiol, triallyl cyanurate, triallyl isocyanurate (TAIC), bismaleimide for use with organic peroxide curing agents.

The elastomer compositions of the present invention may also include a filler. The filler is generally present from 5 to 500, preferably from 7.5 to 250, more preferably from 10 to 80 PHR.

Suitable examples of fillers include calcium carbonate; kaolin clay; natural silica such as crystalline silica, microcrystalline silica, and diatomaceaous silica; synthetic silica such as fumed silica, precipitated silica, and silica gel; talc (hydrated magnesium silicate); mica (hydrous potassium aluminum silicate); wollastonite (calcium metasilicate); carbon black or fiber; and glass fiber or spheres.

Other additives commonly utilized in the art may also be incorporated into the elastomer compositions of the present invention. Such additional additives include, but are not limited to, dispersing agents, softening agents, anti-oxidants, pigments, flame retardants, scorch retarders, foaming agents, tackifiers, blowing agents, lubricants, UV-stabilizers, impact modifiers, and the like. Such polymer additives are described for instance in Plasties Additives and Modifiers Handbook, Edenbaum, Jesse, Editor, Van Nostrand Reinhold, N.Y., 1992.

As recited above, a process for preparing an elastomer composition, includes as a first step providing a mixture of an elastomer, at least one ethylenically unsaturated monomer or at least one polymeric material, having a weighted average molecular weight (Mw) of 500 to 1,000,000, formed from at least one ethylenically unsaturated monomer, and at least one ethylenically unsaturated surfactant monomer. The elastomer, the at least one ethylenically unsaturated monomer, the at least one polymeric material and the at least one ethylenically unsaturated monomer are as described above.

Generally, the mixture is provided by means commonly known in the art. For instance, the mixture may be prepared by combining the constituents using a Banbury mixer, open roll mill, cold lab mill, internal mixer, extrusion mixer, twin roll, or the like. The at least one monomer or at least one polymeric material formed from the at least one monomer is generally added at from 1 to 100, preferably 1 to 50, more preferably 2 to 30 PHR. The ethylenically unsaturated monomer is generally added from 0.1 to 30, preferably from 0.5 to 20, more preferably from 1 to 20 PHR. If used, the additional additives recited above may be added in this step. The amounts of additives used are commonly known in the art.

Once the elastomer mixture is compounded, the composition is cured using methods known in the elastomer art. The curing conditions will vary depending on the elastomer and curing system used and is generally performed according to elastomer manufacturer specifications. However, the curing is generally effected by heating the elastomer composition at a temperature from ambient temperature to 250C. The actual curing temperature will be dependent on the elastomer composition prepared and on the curing system utilized. During the curing step the elastomer is cured and the monomer if present is polymerized in situ.

Once the elastomer is cured and the monomer is polymerized (if required) the cured elastomer composition may be heat aged or post-cured by subjecting the cured elastomer to heat treatment in, for instance, a forced air oven. As with curing, the heat aging or post-curing temperature will be dependent on the type of elastomer composition used.

The elastomeric compositions of the present invention permits wider use of elastomers in applications of demanding conditions wherein the elastomer is exposed to heat, cold, chemicals, lubricants and the like without migration of the polymeric plasticizer of the present invention. Furthermore, the elastomers would permit a higher level of carbon black or other reinforcing agent or filler into the elastomer thereby improving the properties of the elastomers and/or reducing costs. These properties make them especially useful in downhole oil drilling and recovery operations, as seals, tubing or hoses in engines and in other applications involving corrosive fluid transfer. As a result, of the chemistry of the elastomeric compositions and of the vast range of compounds available for use as plasticizers it is possible to tailor the plasticizer to the elastomer to maintain compatibility while plasticizing and enhancing processability of the elastomer.

Accordingly, in the elastomer compositions of the present invention the at least one polymeric material is substantially permanent within the elastomer. For the purposes of this specification, including the attached claims, the term substantially permanent means that there will be a minimal amount of loss of the at least one polymeric material plasticizer from the elastomeric composition because of compatibility problems (see below) or in response to an external stimulus such as heat and/or solvent extraction. Generally, the loss of polymeric material(plasticizer) from the elastomer will be less than 10 percent, preferably less than 5 percent, more preferably less than 3 percent, and most preferably less than 1 percent by weight of the total weight of the at least one polymeric material plasticizer.

By compatibility of the at least one polymeric material and the elastomer is meant that the at least one polymeric material plasticizer remains within the elastomer, i.e., maintains it's position within the elastomer during mixing (also is able to be mixed into the elastomer), molding and during use of any piece prepared from the elastomer composition. The plasticizers of the present invention do not change positions or migrate ("bloom") to the surface of the elastomer composition.

As recited above, a method of plasticizing an elastomer is also contemplated. The method includes providing an elastomer composition according to the present invention, wherein the at least one polymeric material is present in an amount effective to plasticize the elastomer. Generally the at least one polymeric material is present from 2 to 100, preferably from 2 to 60, more preferably from 2 to 30 PHR.

Also contemplated, is a method of enhancing processability of an elastomer, including: providing an elastomer composition according to the present invention, wherein the at least one polymeric material is present in an amount effective to enhance processability of the elastomer. Generally, the at least one polymeric material is present from 2 to 30, preferably from 2 to 20, more preferably from 2 to 10 PHR.

The advantages of the invention are exemplified by the following Examples.

COMPARATIVE EXAMPLES

Comparative polymer additives were prepared as described in U.S. Pat. Nos. 4,912,169 (Examples I-XXI) and U.S. Pat. No. 6,300,407 (Examples 4-8). In addition, a low Mw pBA and low Mw pEHA were used as comparative plasticizers. Other comparative examples included conventional and commercially available tackifiers and plasticizers.

An adhesive composition was prepared, except that Tackolyn™, a commercial tackifying resin, was added to the composition. An elastomer composition was prepared, except that 20 PHR of Natrorez™ 25, a natural resin coal tar derived plasticizer available from Harwick of Akron, Ohio, was added to the composition. The cured elastomer material was measured for Tg by DMTA, Shore A Hardness, 100% elongation, elongation @ break %, tensile strength, and Die C Tear.

Polymeric additives within the scope of this invention were prepared by emulsion polymerization and had the compositions and physical properties given in Table I. The polymeric additives were prepared using the procedure below.

A 3-liter, 4-necked round-bottom flask was charged with 610 grams water and ammonium persulfate (APS). A monomer emulsion feed composed of 280 grams water, 100 grams surfactant, 1000 grams monomer and n-DDM was then added uniformly to the flask over 3 hours while maintaining 84° C. polymerization temperature. Simultaneously with the monomer emulsion feed, APS was added in 45 grams water. Following the monomer addition the batch was held at 84° C. for 30 minutes, then cooled to 70° C. and 1 gram 28% aqueous ammonia was added. The batch was further cooled to room temperature, filtered, and the polymeric product recovered.

tive Tape Council Method No. 7 using ½ times.1 inch overlap areas and 1000 gram weights. Tack was measured using Tag and Label Manufacturer's Institute Loop Tack Tester. The results are presented in Table II and show that the polymeric additives of this invention show an equal or improved balance of peel strength, shear resistance and tack when compared to the polymeric additives of the Comparative Examples.

TABLE II

| | Surfactant | | Loop Tack PO (oz) | Loop Tack CdBd (oz) | Shear (hrs. ½ × 1 × 1) | WWR (Relative Ranking) |
|---|---|---|---|---|---|---|
| Sample | Polymer | Tackifier | | | | |
| A | DDBSA | DDBSA | 39 | 33 | 1.5 | 4 |
| B | DDBSA | NMS-1 | 35 | 28 | 1.4 | 3 |
| C | NMS-1 | DDBSA | 37 | 27 | 1.8 | 2 |
| D | NMS-1 | NMS-1 | 33 | 27 | 1.9 | 1 |

1 best
8 worst

The results show that the polymeric additive of the present invention provides a good overall balance of adhesion properties. Examples had no adverse improved shear resistance,

TABLE I

| Example | Monomer Composition | Surfactant | Surface Tension (dynes/cm) | Shear Rate to Coagulation (sec$^{-1}$) | Function |
|---|---|---|---|---|---|
| Comparative | Tackolyn ™ | NA | 40.5 | 50,000 | Tackifier |
| 1 | IBMA | Abex EP-115 | 45.5 | 100,000 | Tackifier |
| 2 | IBMA | Hitenol BC20 | 51.5 | 500,000 | Tackifier |
| 3 | Sty | Hitenol BC20 | | | Tackifier |
| Comparative | Natrorez ™ | NA | | | Plasticizer |
| 4 | BA | Polystep NMS-1 | | | Plasticizer |
| 5 | EHA | Polystep NMS-1 | | | Plasticizer |
| 6 | LMA/SMA | Polystep NMS-1 | | | Plasticizer |

Adhesion Testing

Polymeric additives prepared in the preceding examples were tested for adhesion properties in a butyl acrylate-based emulsion adhesive. The emulsion-polymerized polymeric additives were treated with a 28% aqueous ammonium hydroxide solution to a pH of 9. Each of the above emulsions were then blended at various levels with the acrylic emulsion adhesive and the pH adjusted to 9 by addition of ammonium hydroxide solution. The adhesive-additive blends were then coated on acetone-wiped polyethylene terephthalate sheet and dried at 105C. for 5 minutes (or, where indicated, on untreated, biaxially-oriented polypropylene and dried at 70 C. for 15 min.). The thickness of the dried adhesive films was 0.001 inches. The coated sheets were then laminated to an untreated polypropylene cover sheet. The laminates were cut into 1-inch wide strips and conditioned for at least 24 hours at 25 C. and 50% relative humidity prior to testing.

The laminate samples were visually inspected for clarity and rated according to the following scale:
E=excellent film quality with complete clarity
VG=very good film quality with very slight haziness
G=good film quality with slight haziness
F=fair film quality with moderate haziness
P=poor film quality with severe haziness Peel strengths were determined according to Pressure Sensitive Tape Council Method No. 1 using a 1-minute dwell time. Shear resistances were measured using Pressure Sensibetter film clarity, comparable peel strength and loop tack, all with improved water whitening resistance. The results show that relatively high levels (i.e. 40%) of polymeric additive can be used if the molecular weight of the additive is sufficiently low. The higher levels of these very low molecular weight additives result in dramatic improvements in tack and peel strength as compared to corresponding polymers using conventional surfactants when added to acrylic PSA emulsion polymers. The results are summarized in highlights in Table III.

TABLE III

| | | Surfactant in Tackifier | |
|---|---|---|---|
| | | Traditional (DS-4) | Non-Migrating Surfactant (NMS-1) |
| Surfactant in Polymer | Traditional (DS-4) | 4 | 3 |
| | Non-Migrating Surfactant (NMS-1) | 2 | 1 |

1 = best
4 = worst

Surface tension of Hitenol™ BC-20 produced polymers was higher than that of the traditional polymers. Additionally, when testing shear stability, the polymers made with reactive surfactant took longer time to decompose than their traditional surfactant counterparts, and both were better than conventional, commercial tackifiers (see also Table I).

The elastomer composition of the present invention (Examples 4-6) has comparable Tg and Shore A hardness with the elastomer composition with no plasticizer or conventional plasticizers (Comparative Examples). Furthermore, the lower PSI at 100% elongation and the % elongation at break also indicate efficient plasticization of the elastomer composition of the present invention and exhibit enhanced processability. Strength in tensile is similar to the elastomer compositions with conventional plasticizers. The molding compatibility, that is the ability of the plasticizer to remain in the elastomer composition without a change in position and/or migration (bloomed) to the surface during molding. The elastomer compositions of the present invention exhibited compatibility with the fluoroelastomer whereas the Paraplex containing elastomer composition failed.

The cured elastomer material was measured for Tg by DMTA, Shore A Hardness, 100% elongation, elongation @ break %, tensile strength and was observed for molding compatibility.

The elastomer compositions were tested for solvent resistance by immersion in diesel fuel at 40° C. for 100 hours.

A comparison of the results before extraction and those after extraction illustrate the increased resistance to extraction in the elastomer compositions of the present invention and the loss of compatibility of Paraplex™ 40 during the molding/curing of the elastomer composition. The elastomer compositions of the present invention show comparable or increased plasticization after diesel extraction and the conventional elastomer composition shows a decrease in plasticization with Examples before extraction and after extraction are compared.

What is claimed is:

1. A polymeric additive for modifying tack, peel, shear, wetting, rheology, stability, plasticity, plasticizer compatibility or glass transition temperature of an aqueous emulsion polymer, wherein the polymeric additive comprises: an aqueous acrylic emulsion polymer comprising, as copolymerized units, 0.25% to 99.75% by weight, based on dry polymer weight, of one or more monoethylenically unsaturated nonionic C1-C10(meth)acrylic monomer, from 0.40% to 99.75% by weight, based on dry polymer weight of one or more ethylenically unsaturated surfactant monomers and from 0.25% to 2.5% by weight, based on dry polymer weight, of one or more monoethylenically unsaturated acid monomer; the aqueous emulsion polymer having a Tg of $-100°$ C. to $100°$ C. and a weight average molecular weight between 1,000 and 40,000.

2. An adhesive composition comprising: (a) from 0.5 to about 55% on a dry weight basis of one or more polymeric additives prepared from an aqueous acrylic emulsion polymer comprising, as copolymerized units, 0.25% to 99.75% by weight, based on dry polymer weight, of one or more monoethylenically unsaturated nonionic C1-C10(meth)acrylic monomer, from 0.40% to 99.75% by weight, based on dry polymer weight of one or more ethylenically unsaturated surfactant monomers and from 0.25% to 2.5% by weight, based on dry polymer weight, of one or more monoethylenically unsaturated acid monomer; the aqueous emulsion polymer having a Tg of $-100°$ C. to $100°$ C. and a weight average molecular weight between 1,000 and 40,000; and (b) one or more adhesive polymers or copolymers prepared from one or more monomers selected from the group consisting of styrene, butadiene, acrylonitrile, ethylene, vinyl acetate, acrylic acid, esters of acrylic acid, methacrylic acid and esters of methacrylic acid.

3. An adhesive composition containing a blend of (a) one or more adhesive polymers or copolymers prepared from one or more monomers selected from the group consisting of styrene, butadiene, acrylonitrile, ethylene, vinyl acetate, acrylic acid, esters of acrylic acid, methacrylic acid and esters of methacrylic acid and (b) from 0.5 to about 55% on a dry weight basis of one or more polymeric additives wherein said polymeric additive comprises an aqueous acrylic emulsion polymer comprising, as copolymerized units, 0.25% to 99.75% by weight, based on dry polymer weight, of one or more monoethylenically unsaturated nonionic (meth)acrylic monomer, from 0.40% to 99.75% by weight, based on dry polymer weight of one or more ethylenically unsaturated surfactant monomers and from 0.25% to 2.5% by weight, based on dry polymer weight, of one or more monoethylenically unsaturated acid monomer; the polymer additive having a Tg of $-100°$ C. to $100°$ C. and a weight average molecular weight between 1,000 and 40,000.

4. A multifunctional polymer additive comprising: an aqueous acrylic emulsion polymer comprising, as copolymerized units, 0.25% to 99.75% by weight, based on dry polymer weight, of one ore more monoethylenically unsaturated nonionic (meth)acrylic monomer, from 0.40% to 99.75% by weight, based on dry polymer weight of one or more ethylenically unsaturated surfactant monomers and from 0.25% to 2.5% by weight, based on dry polymer weight, of one or more monoethylenically unsaturated acid monomer; the aqueous emulsion polymer having a Tg of $-100°$ C. to $100°$ C. and a weight average molecular weight between 1,000 and 40,000; wherein the polymeric additive modifies an aqueous emulsion polymer by stabilizing, tackifying or plasticizing the aqueous emulsion polymer.

5. An additive for modifying tack, peel, shear, wetting, rheology, stability, plasticity, plasticizer compatibility or glass transition temperature of an aqueous emulsion polymer, wherein the polymeric additive comprises: an aqueous acrylic emulsion polymer comprising, as copolymerized units, 0.25% to 99.75% by weight, based on dry polymer weight, of one or more monoethylenically unsaturated nonionic C10-C50(meth)acrylic monomers, from 0.40% to 99.75% by weight, based on dry polymer weight of one or more ethylenically unsaturated surfactant monomers and from 0.25% to 2.5% by weight, based on dry polymer weight, of one or more monoethylenically unsaturated acid monomers; the polymer additive having a Tg of $-100°$ C. to $100°$ C. and a weight average molecular weight between 500 and 50,000.

6. An elastomer comprising: (a) from 0.5 to about 55% on a dry weight basis of one or more polymeric additives prepared from an aqueous acrylic emulsion polymer comprising, as copolymerized units, 0.25% to 99.75% by weight, based on dry polymer weight, of one or more monoethylenically unsaturated nonionic C10-C50(meth)acrylic monomer, from 0.40% to 99.75% by weight, based on dry polymer weight of one or more ethylenically unsaturated surfactant monomers and from 0.25% to 2.5% by weight, based on dry polymer weight, of one or more monoethylenically unsaturated acid monomer; the aqueous emulsion polymer having a Tg of $-100°$ C. to $100°$ C. and a weight average molecular weight between 1,000 and 40,000; and (b) one or more adhesive polymers or copolymers prepared from one or more monomers selected from the group consisting of styrene, butadiene, acrylonitrile, ethylene, vinyl acetate, acrylic acid, esters of acrylic acid, methacrylic acid and esters of methacrylic acid.

7. The polymeric additive of claim 1 wherein the polymeric additive comprises essentially no other surfactant than the ethylenically unsaturated surfactant monomers.

8. The adhesive composition of claim 2 wherein the polymeric additive comprises essentially no other surfactant than the ethylenically unsaturated surfactant monomers.

9. The adhesive composition of claim 8 wherein the adhesive polymer or copolymer is formed using essentially no other surfactant than ethylenically unsaturated surfactant monomers.

10. The multifunctional polymer additive of claim 4 wherein the multifunctional polymer additive comprises essentially no other surfactant than the ethylenically unsaturated surfactant monomers.

11. The additive of claim 5 wherein the additive comprises essentially no other surfactant than the ethylenically unsaturated surfactant monomers.

12. The elastomer of claim 6 wherein the polymeric additive comprises essentially no other surfactant than the ethylenically unsaturated surfactant monomers.

13. The elastomer of claim 12 wherein the elastomer is formed using essentially no other surfactant than ethylenically unsaturated surfactant monomers.

* * * * *